Nov. 2, 1943.  J. W. DYER ET AL  2,333,365
AIRCRAFT
Filed July 26, 1935.  6 Sheets-Sheet 1

Inventors
John William Dyer
and David Kay

Fig. 1.ᵃ

Nov. 2, 1943.   J. W. DYER ET AL   2,333,365
AIRCRAFT
Filed July 26, 1935   6 Sheets-Sheet 3

Nov. 2, 1943.　　　J. W. DYER ET AL　　　2,333,365
AIRCRAFT
Filed July 26, 1935　　　6 Sheets-Sheet 5

Patented Nov. 2, 1943

2,333,365

UNITED STATES PATENT OFFICE 2,333,365

AIRCRAFT

John William Dyer and David Kay, Edinburgh, Scotland, assignors to Kay Gyroplanes Limited, Edinburgh, Scotland Application July 26, 1935, Serial No. 33,397
In Great Britain July 27, 1934

13 Claims. (Cl. 244—18)

This invention relates to aircraft of the kind in which the lift is derived wholly or partly from an overhead rotative wing-system, commonly referred to as a "rotor," which turns about a more or less vertical axis, and more particularly to this kind of aircraft in which the rotary motion of the rotor when the machine is in flight takes place owing to the action of the air-flow or pressure. In aircraft of this kind, it is usual to provide means whereby the rotor can be positively and mechanically driven when required (e. g., before taking off) and it is with the rotor drive employed for this purpose that the present invention is more particularly concerned.

The usual method of driving the rotor initially prior to flight is to couple a power take-off shaft to the power unit of the aircraft by a clutch under the control of the pilot, said shaft being flexible or jointed and being provided with a starter pinion meshing with a suitable gear, such as a toothed annulus, associated with the rotor hub.

One object of the present invention is to provide an improved mounting for supporting the said starter pinion in mesh with the gear associated with the rotor hub, another object being to provide improved means for engaging and disengaging the pinion and also, if desired, for simultaneously coupling and uncoupling the starter pinion and a power unit.

With the above and other objects in view, in an aircraft of the kind referred to, we provide mechanism for operatively connecting a power unit and the rotor so that the latter shall be rotated mechanically up to the speed required prior to flight, said mechanism comprising a starter pinion which is so mounted and is so disposed relatively to a gear wheel associated with the rotor hub or other rotor-supporting member that it can be swung into and out of mesh with the gear wheel.

The starter pinion is preferably connected to or integral with a spindle mounted on the rotor-sub-supporting member in such a manner that the axis of the spindle can be moved in both directions along a curved path towards and away from a position in which it is engaged by a gear wheel associated with the rotor hub, no matter whether the said supporting member is in its normal position or inclined thereto or moved bodily therefrom.

In an aircraft of the type referred to in which the angles of incidence of the rotor blades are variable, it is preferable to arrange that the starter pinion shall be disengaged from the gear wheel associated with the rotor hub automatically under the action of means which are operated by mechanism adapted to vary the angles of incidence of the rotor blades. This is an important feature of this invention.

The pinion is also preferably so disposed and movable relatively to the gear wheel that the reaction of the teeth on the pinion and gear wheel will cause the teeth to move into deeper engagement when the pinion is driving the gear wheel, whereas if the gear wheel tends to drive the pinion the reaction between the teeth will tend to throw the pinion out of mesh with the gear wheel.

In one construction, the spindle is rotatably mounted in a housing which is turnably arranged in a casing carried by the rotor-hub-supporting member or mast, the longitudinal axis of the spindle being parallel to but spaced or offset from the longitudinal axis about which the said housing is adapted to turn in the casing, the starter pinion being adapted to drive an internally-toothed member carried by the rotor hub. In such a construction, the said housing can be turned within the said casing to engage and disengage the teeth on the internally-toothed member and pinion by means (e. g., a control cable) under the control of the pilot. The said housing can also be arranged to be turned to disengage the teeth on the internally-toothed member and pinion automatically under the action of means operated by mechanism adapted to vary the angles of incidence of the rotor blades. For example, the control member, connected to the said housing by a cable, is adapted to turn the housing in both directions to engage and disengage the starter pinion and its associated gear wheel, means being provided for holding the said control member in the position in which the pinion and gear wheel are in engagement until such time as the control member is released, either manually or automatically under the action of control mechanism for varying the angles of incidence of the rotor blades.

Although one construction of the invention has been described above as being applied to a rotor hub which is driven through an internally-toothed annulus it will be understood that it could be made to operate equally well in conjunction with an externally toothed gear wheel. It might be difficult, however, to obtain such a compact arrangement in this case.

As applied to a rotor hub which is adapted to be tilted laterally and longitudinally and, if so desired, displaced bodily of the aircraft, a further feature of this invention consists in mounting the starter pinion supporting member on a part (such as the rotor-carrying mast) whose inclination varies in accordance with the inclination of the rotor hub as a whole. In this connection, an arrangement for driving the rotor hub in accordance with the present invention may advantageously be combined with the rotor tilting arrangement as described in our co-pending patent applications Serial No. 33,395 and Serial No. 33,399, which have matured into Patents Nos. 2,097,117 and 2,097,118, in which the rotor hub is described as being mounted on a form of mast provided at its lower end with bracket members or side cheeks by which it is supported on a device for imparting lateral and permitting longitudinal swinging movement of the rotor hub.

In applying the present invention to this arrangement, the pinion-supporting member is bolted or otherwise secured to the lower part of the mast or its supporting brackets or side cheeks.

In this way, the axis of rotation of the pinion will remain in its proper position relative to the hub gear member no matter to what angle the mast is inclined. It is necessary, however, in applying this feature of the invention, to provide a universal connection between the pinion spindle and its driving shaft in order to allow for the tilting and possibly also to provide a telescopic connection at a suitable point to allow for the longitudinal tilting.

It will be seen that by employing a final drive for the rotor hub constructed in accordance with the present invention, a minimum of effort will be required to move the driving pinion into or out of mesh since, in both cases, the movement will be assisted by reaction set up between the two sets of meshing teeth.

One constructional embodiment of the invention applied to a rotor hub will now be described, by way of example, with reference to the accompanying drawings, whereon.

Referring to the drawings:

The method of mounting the rotor mast and the manner of tilting the same is fully described in the specifications of our other co-pending applications, Serial Nos. 33,395 and 33,399.

Consequently, only a brief description will be necessary herein.

Figures 1, 9:
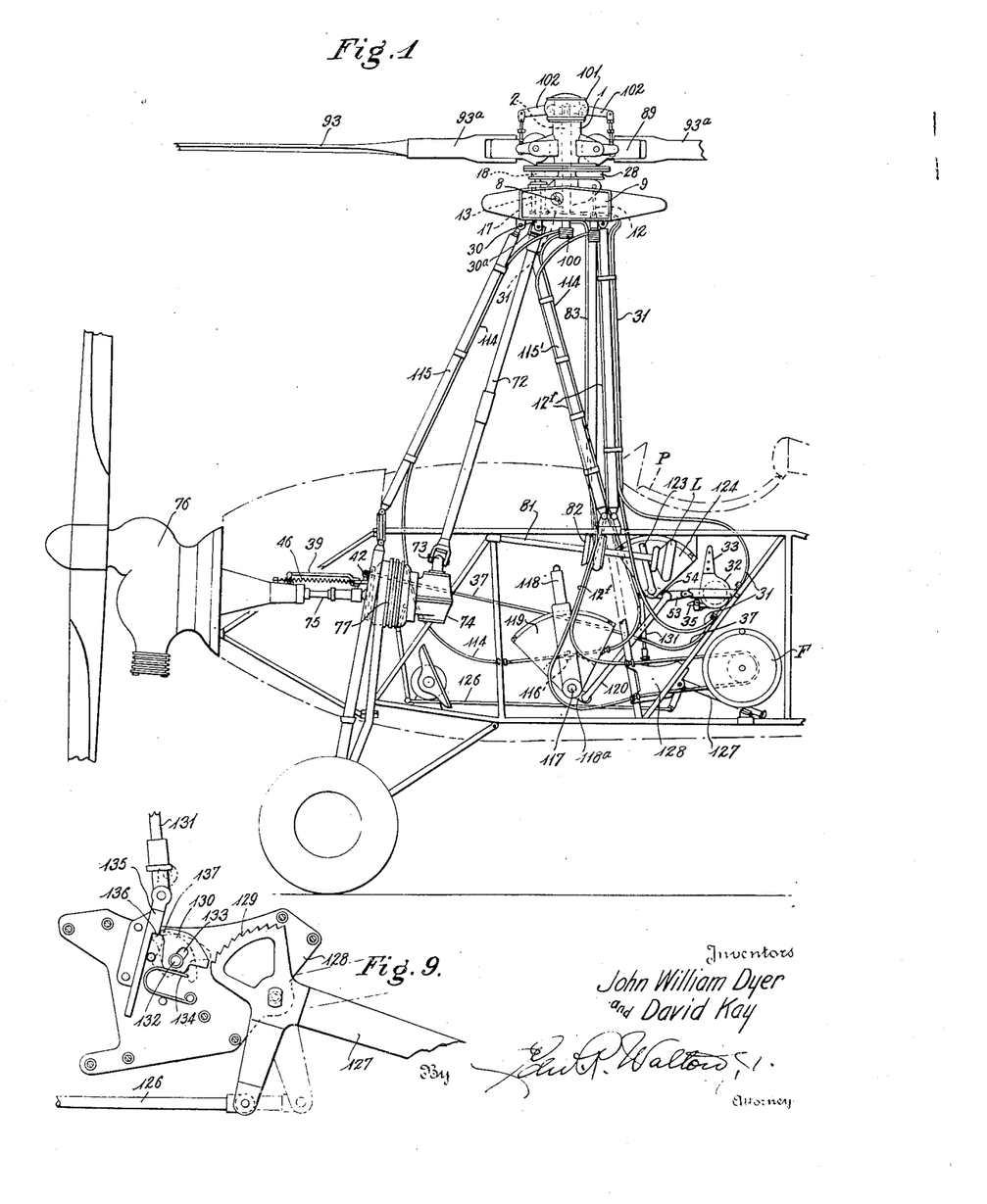
Fig. 1 is a side elevation of the front end of the aircraft of the type above referred to, but with the shell or skin of the aircraft being shown in dotted lines in order that the detailed construction and arrangement of parts may be more clearly viewed and with the lifting or rotor blades broken for convenience of disclosure.
Fig. 9 is a side elevation, with one of the supporting plates removed, showing the holding means for the throw-off clutch in the rotor blade drive.
Figure 1A:
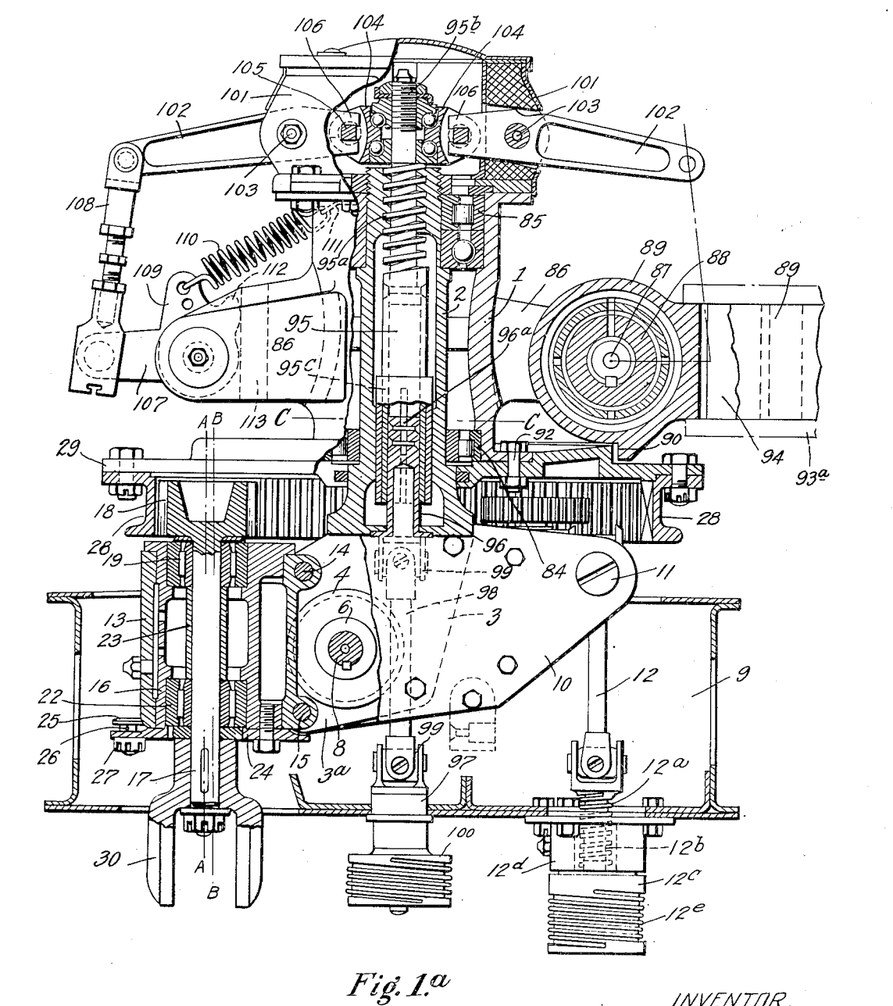
Fig. 1A is a view, partly in section, of the rotor-supporting mast with the starter pinion and its associated gear wheel applied thereto.
Figure 2:
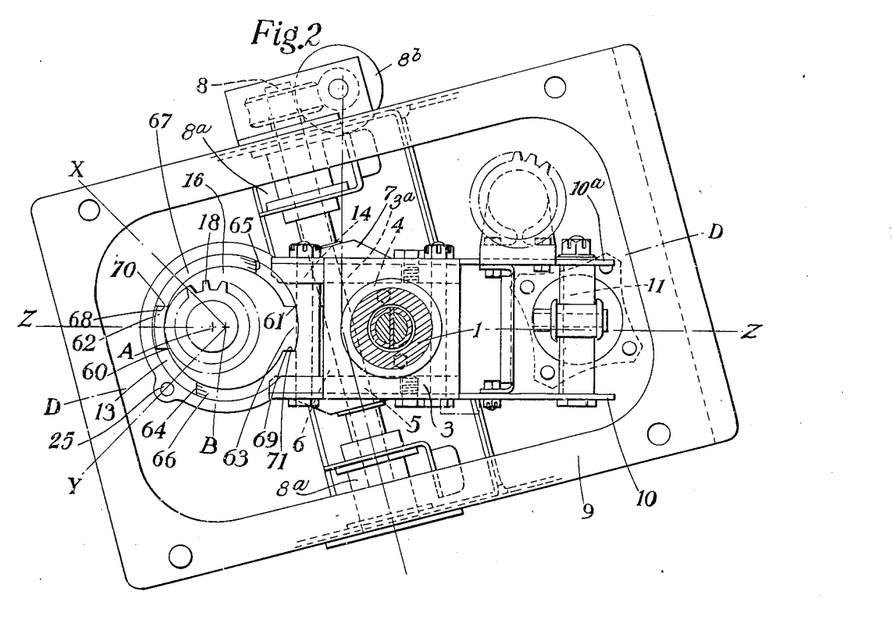
Fig. 2 is a plan view, partly in section, on the line C—C, in Fig. 1A.

The rotor hub 1 is turnably arranged upon the rotor-supporting mast or member 2 which in turn has the jaws 3 and 3A of its forked lower end pivotally mounted upon the bearing parts 4 and 5 of the crank pin member or barrel 6 of the hinge-pin member or Z crank 7 (see Figs. 1A and 2). The latter also comprises the control shaft 8 which is turnable in bearings 8a in the rotor system supporting structure 9 and upon which the said member or barrel is fixed. The axis of the shaft 8 is set at right angles to the longitudinal axis D—D of the aircraft and, consequently, the axis of the member or barrel 6 is inclined at an angle thereto. Cheek plates 10 and 10a are secured respectively to the jaws 3 and 3A and are interconnected at their rear ends by a cross pin 11 to which is connected one end of a link 12 that anchors the rear end of the rotor support adjustably to the structure 9. This adjustable anchorage may be accomplished by connecting the lower end of the link 12 for universal movement to a threaded spindle 12a engaging in a correspondingly threaded bore 12b of a cable drum or pulley 12c, rotatably mounted in a bearing 12d to the rotor supporting structure 9. The drum or pulley 12c is provided with grooves 12e for the reception of the operating cable 12f, Fig. 1, which passes over the hand wheel F preferably disposed in the cockpit P.

The lateral tilting of the mast and rotor on the supporting structure 9 is accomplished by the wheel L disposed in the cockpit adjacent the pilot's seat and mounted on a shaft 81. This shaft 81 has a cable pulley 82 over which passes the cable 83 which cooperatively engage a cable drum 8b, Fig. 2, which through mechanism disclosed in detail in our co-pending application Serial No. 33,395 rotates the shaft 8 and, consequently, the Z barrel 6, which is keyed thereto, causing relative movement between the Z crank 7 and the jaws 3 and 3A which support the mast 1, thus effecting a lateral tilting of the mast 1 and the rotor supported thereby according to the direction of rotation of the shaft 8.

Rotation of the shaft 8 by the hand wheel L will cause the Z crank 7 to tilt the rotor mast 2 to either side according to the direction of rotation, and, since the link 12 will bias such movement, causes the mast to incline forwardly or rearwardly as the case may be, as well as to tilt laterally, as explained in our copending application Serial No. 33,395. The partly lateral and partly fore and aft movement of the mast, therefore, is forward on one side and rearward on the other of a plane at right angles to an axis Z—Z and passing through the axis of the mast 2. The fore and aft setting of the mast 2 may be varied by rotating the drum 12c by the hand wheel F which will raise or lower the point of anchorage of the end 11 of the mast base or carriage provided by the parts 3, 3a, 10, and 10a.

The rotor hub 1 concentrically surrounds the mast 2 and is mounted thereon by antifrictional bearings 84 and 85 in any suitable manner.

The hub 1 is provided with pairs of spaced radially projecting arms 86, one pair for each rotor blade 92 and each pair being disposed at equal distances about the center of the hub. Between the arms 86 of each pair is disposed a hinge 87 of the Z crank construction having a barrel 88 keyed thereto. Surrounding each of the barrels 88 is a link-block 89 to which are attached the inner ends of rotor blade spars 93a of the type usually employed in aircraft of the autogyro type. These link blocks 89 are free to pivot on the barrels 88 to permit substantial vertical flapping movement of the blades when the blades are revolving about the mast 2, but each is prevented from dropping too far when the blades are stationary or only slowly rotating, by means of stops 90 adapted to cooperate with shoulders 91 on the flange disc 29 secured by bolts 92 to the rotor hub 1. (Figs. 1 and 1A.)

The spar 93a (see Figs. 1 and 1A) of each rotor blade is pivotally connected to the link-block 89 for lateral movement on the general plane of rotation of the rotor—that is, about a substantially vertical pivot pin 94 provided in the link-block 89 and passing through openings in the jaws of the forked end of the spar 93a.

The angle of incidence of each of the rotor blades 93 is varied by turning, preferably simultaneously, the pins or axles 87 of the Z crank members 88 in the desired direction and to the desired degree. This is accomplished by means more specifically described and claimed in our co-pending application Serial No. 33,398. Briefly, the angles of incidence of the rotor blades are varied by means which comprise a spindle 95 disposed within the hollow mast 2 and having a threaded end 95a in threaded engagement with a complementally threaded portion of the mast through the upper end of which the spindle extends, as at 95b. The lower end portion of the spindle is provided with a longitudinal bore 95c therein, in which slidably extends a shaft 96, splined therewith at 96a, forming a telescopic joint. The lower end of the shaft 96 is connected to the upper end of a drum spindle 97 by means of a link 98 and universal joints 99, the spindle 97 being journalled in the bottom wall of the housing structure 9 through which it extends downwardly and having fast thereon a cable drum 100. Thus, irrespective of what may be the inclination and/or body displacement of the rotor mast 2 within the limits allowed by the mechanism, the telescopic joint formed by the parts 95c and 96 and the universal joints 99 will allow the spindle 95 to be rotated by the drum 100 and, by virtue of the coacting threads 95a, will be reciprocated longitudinally of the mast.

Mounted on the top of the rotor hub 1 and fast thereto is a hub extension 101 from which extends radial arms 102, there being as many of these arms as there are rotor blades 93, and each being pivoted intermediate their length, at 103. A collar 104 surrounds and is rotatably mounted upon the upward extended end of the spindle 95b and has horizontal portions 105 which engage forked end portions 106 on the inner ends of the arms 102.

Each of the pins or axles 87 of the Z-cranks 88 have fixed to one end thereof a lever 107, the outer end of which is connected to the outer end of an adjacent arm 102 by an adjustable link 108. Also, fast on each of the pins or axles 87 is an ear 109 to which one end of the tension spring 110 is connected, the opposite end of the spring being connected to an anchor plate 111 secured to the hub 1, the ears 109 each having a stop 112 normally engageable with an adjacent lug 113 on the rotor hub by the tension spring 110.

The cable drum 100 is rotated by the cable 114 wound therearound and has its reaches led down legs 115 and 115', of the rotor mast supporting pylon structure, into the cockpit (see Fig. 1) from which they are led in opposite directions to the grooved surface of a quadrant 116 fixed on a rotatable spindle 117 journalled in bearings carried by the supporting structure of the fuselage, the said spindle and quadrant being oscillatable through the medium of the control lever 118.

As shown in Fig. 1, the lever 118 may be moved to positions for varying the angle of incidence of each of the rotor blades by properly positioning the lever with respect to a stationary quadrant 119. The lever 118 may be located in the running up or no-lift position by positioning it at the forward or left hand end of the quadrant 119, as viewed in Fig. 1, and may be located in maximum angle of incidence or lifting position by moving it to the rear or right handle end of the stationary quadrant 119, as viewed in Fig. 1. For normal flight positions, at any desired angle of incidence, the lever may assume various positions intermediate the ends of the quadrant 119, movement of the lever 118 in either direction transmitting a corresponding movement to the cable 114 which will correspondingly operate the drum 100 and the spindle 95.

Figure 6:
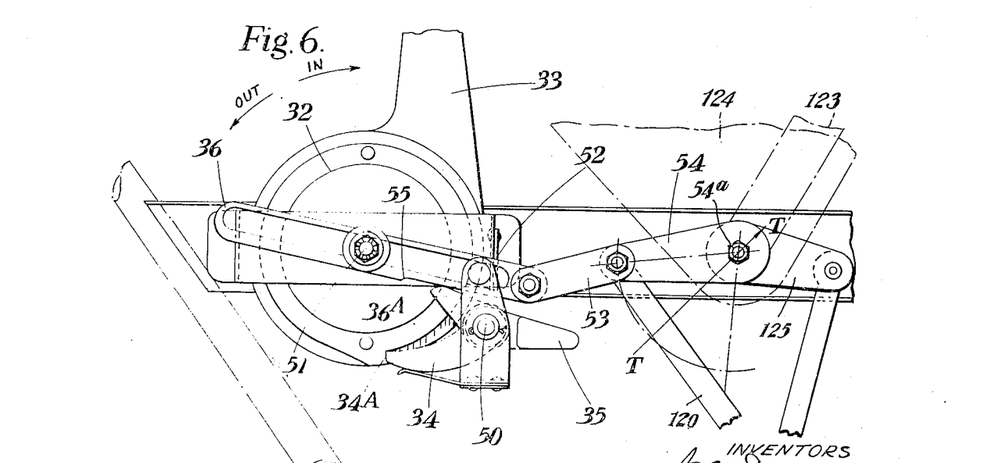
Fig. 6 is a view of the other side of the control member shown in Fig. 5.

Movement of the lever 118 is also transmitted to a short arm lever 118a through a link 120, Figs. 1 and 6, to the lever 54 fixed to the shaft 54a of the pointer 123 a blade of incidence indicator 124. Attached to the pointer 123 or its shaft 54a is a lever arm 125 to which is attached one end of a tie-bar 131 for the purposes of releasing the manually operable clutch 77 to disconnect the motor 76 or other source of power from the rotor hub 1, when the angle of incidence of the rotor blades has been increased a predetermined amount, as more fully described in our copending application Serial No. 33,396 and therefore only briefly referred to here with reference to Fig. 9.

With reference to Figs. 1 and 9, the manually operated frictional clutch 77 is biased by a spring means which will normally urge the clutch to de-clutched position and may be operated to clutched position by any suitable linkage or leverage, indicated by the numeral 126, connected with an operating handle 127 in the cockpit disposed within the reach of the pilot. The handle 127 is pivoted between supporting plates 128 and is provided on one end with a ratchet tooth segment 129 so arranged as to be engaged when required by pawl 130 loosely carried on a pivot pin 132 engaging an elongated slot 133 in the pawl.

When the clutch 77 is disengaged or in declutched position its operating lever 127, ratchet 129, and pawl 130 are in the positions shown in full lines Figs. 1 and 9. A spring 132 tends to hold the pawl in this position. A slidable lockbar 135 is disposed between the plates 128 and is free to slide from the position shown in full lines of Fig. 9 into the position shown in dotted lines or vice versa. The lock-bar 135 has a reduced lower end forming a shoulder 136. When the slide bar is in full line position shown, a corner 137 of the pawl lies opposite and just clears or only lightly touches the unreduced portion of the bar which forms an abutment or obstruction to pivotal movement of the pawl away from cooperative relation with the ratchet teeth 129.

To effect an engagement or clutching of the clutch 77, the handle 127 is raised, which causes the ratchet teeth 129 to engage the pawl 130 against the resistance of the spring 134, and, by virtue of the shape and disposition of the slot 133 in the pawl, the resultant movement of the pawl is virtually a rotation about its corner 137 in a clockwise direction. Thus, the clutch 77 will be engaged and the pawl will retain the operating handle 127 in position to maintain this clutching engagement.

With the clutch operating lever 127 in the above mentioned position and when the angles of incidence of the rotor blades 93 have been increased to a predetermined extent by movement of the lever 118 in the manner above described, the rod 131 will move the lock-bar 135 to a position indicated in dotted lines Fig. 9 and the reduced portion of the lock-bar will lie opposite the corner 137 of the pawl, whereby the pawl may then turn in a counterclockwise direction about the pin 132, under the influence of the pressure exerted on the other side of the pawl by the ratchet 129. Thus, the pawl will swing clear of cooperative engagement with the ratchet teeth 129 and the clutch operating lever 127 will drop to its normal position, shown in full lines, and the clutch 77 will be disengaged.

The present invention is concerned more particularly with the mechanism above described or its equivalent, or such portions thereof, as operate in combination with the starter pinion 18 and its operating parts now to be more fully described. This starter pinion structure comprises a hollow outer casing 13 fixed by bolts 14 and 15 between the front ends of the jaws 3 and 3a, a hollow inner housing 16 carrying the starter pinion 18 and turnably arranged within the casing 13 with the longitudinal axis A—A of the starter pinion 18 offset relatively to the longitudinal axis B—B of the outer casing (Figs. 1A and 2).

The spindle 17 of the starter pinion 18 is rotatably arranged in upper and lower needle roller bearings 19 and 20, which are arranged in recesses 21 and 22 formed in the inner housing 16, the axes of said bearings and, consequently, that of the pinion 18 being coincident with the axis A—A of the bore of the inner housing and, therefore, offset from the axis B—B of the outer casing 13. A distance tube 23 surrounds the spindle 17 and extends between the two bearings 19 and 20. A bearing-retaining plate 24 is fixed to the inner housing 16 and is provided at the exterior of the casing 13 with a headed locking pin 25 having a hole 26 for the passage of a cable therethrough, said pin being secured in position by the nut 27.

From the above description it will be followed that the inner housing 16 can be turned in the fixed outer casing 13 into and out of the position in which the pinion 18 is respectively engaged with and disengaged from the internal teeth of a crown wheel 28 which is bolted to the bottom flange 29 of the rotor hub 1, the latter being turnably mounted on the rotor mast 2 in the manner above described. There are, of course, many ways in which the inner housing 16 can be turned and one of them will be described hereinafter. In the meantime, it may be noted that the position of the cable locking pin 25, when the pinion is engaged with the rotor gear 28, is shown by the line Y—B in Fig. 2, and, when the pinion is tripped out of engagement with the gear 28, by the line X—B. The lower end of the spindle 17 is fixed to a fork 30 and is connected by a universal joint to the forked upper end of the telescopic rotor drive shaft 72 the lower end of which is connected by a universal joint 73 to the power output shaft of a gear-box 74 which may be connected to an ouput tail shaft 75 from the engine 76 under the control of a manually operable friction clutch 77, see Fig. 1.

Figure 3:
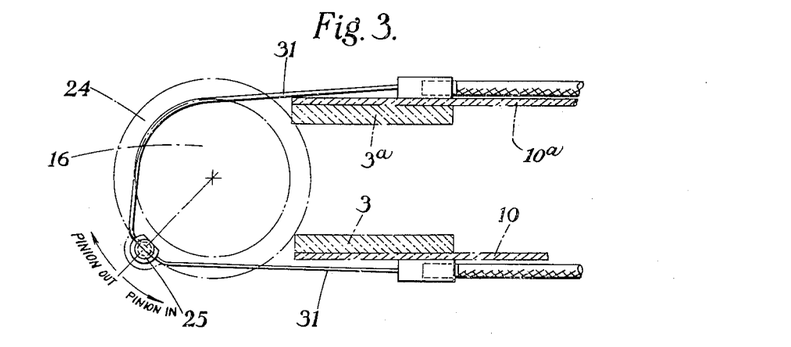
Fig. 3 is a view showing the connection of the control cable to the turntable casing carrying the starter pinion.
Figure 4:
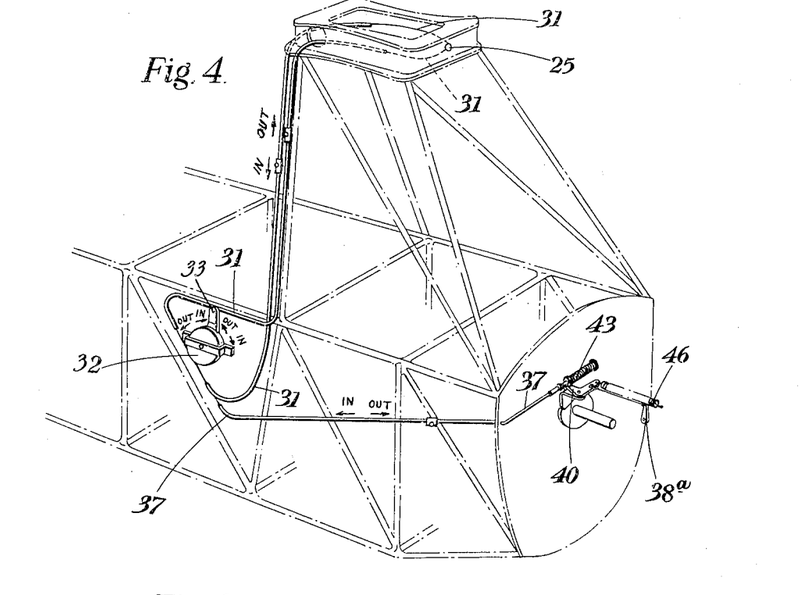
Fig. 4 is a diagrammatic view showing the relative disposition on the aircraft of the control mechanism for the starter pinion and a clutch for operatively coupling the engine tail shaft to the starter pinion.
Figure 5:
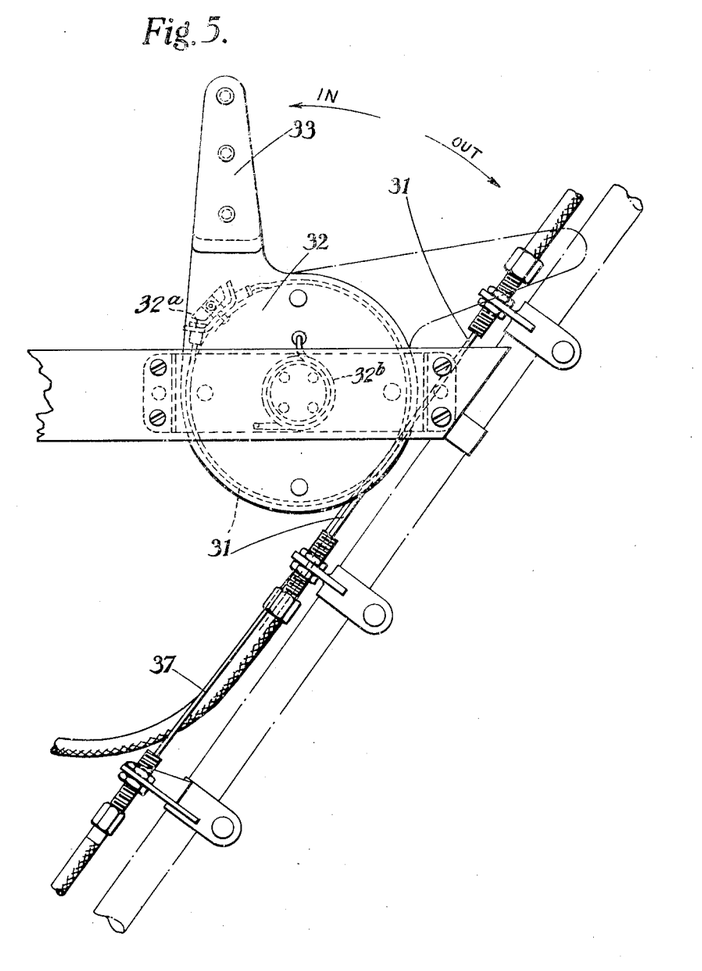
Fig. 5 is a view, to a larger scale, of the control member for moving the starter pinion into and out of engagement with the gear wheel associated with the rotor hub.

A cable 31, Figs. 1, 3 and 4, is fixed to the plate 24 on the inner housing 16 by means of the cable locking pin 25, the two ends of the cable being led to and passed in opposite directions around a control drum 32, Figs. 4 to 6, and fastened thereto by any suitable means such as indicated at 32a, the control drum 32 having a handle 33 arranged near to the pilot in the cockpit P, Fig. 1. The control drum 32 is urged in such a direction (as indicated by dotted lines in Fig. 5) by an internal spring 32b that the pinion 18 will normally be held disengaged from the teeth of the crown wheel 28 but the drum is held in the position, as shown in full lines in Fig. 5, in which the pinion and crown wheel are in mesh by the following arrangement: A spring-pressed pawl 34, Fig. 6, a manually operable trip 35 and a further trip 36A are all fixed to a turnable pivot pin 50, the pawl being adapted to engage behind an abutment 34A on the control 32 when the control has been moved in its full line position in which the pinion 18 is engaged with the wheel 28. A slide 36 is slidably mounted on the spindle 51 of the control drum 32 and also on a pin 52 which is arranged in a bracket which supports the pawl and the trips 34 and 36A. The slide 36 is connected by a pair of links 53 to a lever 54 arranged to be pivoted by the control lever 118 through the medium of the link 131, which lever 118 controls the angles of incidence of the rotor blades, Fig. 1, as described and as more fully described and shown in our copending application Serial No. 33,398. Thus, the pawl 34 can be tripped either by the trip 35 or by the slide 36 which, when the lever 54 is in the position T—T has acted to depress the pawl 34 by the engagement of a shoulder or cam element 55 with the trip 36A. The arrangement in this construction is such that the pawl 34 is tripped through the slide 36 when the incidence control mechanism has brought the rotor blades to the said incidence at which the above mentioned manually operated clutch 77 is tripped. After the pawl 34 has been disengaged, the spring 32b (Fig. 5) will move the drum 32 to its dotted line position and thereby operating the cable 31 to rotate the casing 16 from the position Y—B in which the pinion is engaged with the crown wheel into the disengaged position X—B.

Figures 7, 8:
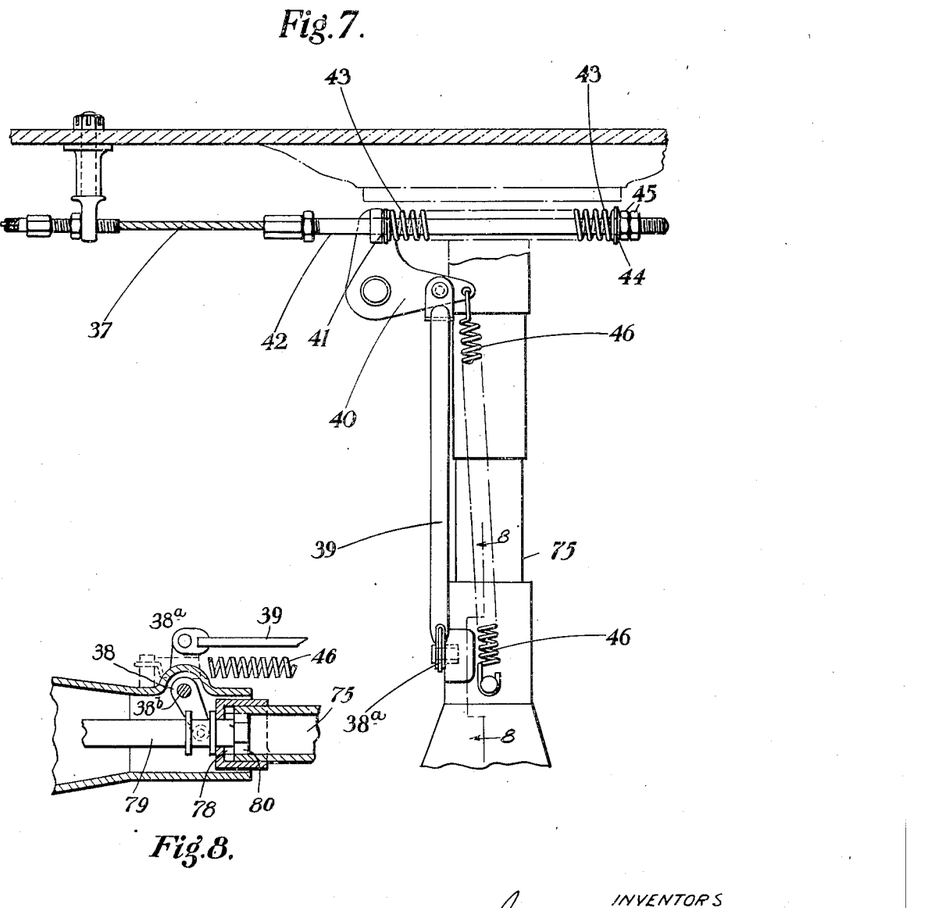
Fig. 7 is a view, also to a larger scale, showing the mechanism for actuating the clutch which operatively connects the starter pinion to the tail shaft of the engine.
Fig. 8 is a sectional view taken substantially on line 8—8 of Fig. 7 and showing one type of dog-clutch which may be employed for connecting the engine with the engine tail shaft.

Obviously, arrangements must be made for the pinion 18 to be operatively connected to the engine 76 when the pinion is engaged with the crown wheel 28. In the present construction, this is arrived at by connecting one end of a cable 37 to the drum 32 (Figs. 1, 4, 5 and 7), the cable being wound on the latter in a direction to insure that as the pinion 18 is engaged with the crown wheel, simultaneously the engine will be operatively connected to a shaft in the rotor drive mechanism. In this particular construction, one element 78 of a dog-clutch (see Fig. 8) is slidably arranged on the engine crank shaft 79 and the other element 80 on adjacent end of the power take-off or tail shaft 75, which is adapted to drive the said pinion 18 through mechanism including the throw-off clutch 77, gear-box 74, and the rotor drive shaft 72. The element 78 of the safety dog-clutch is operated by levers 38 and 38a on a rotatable shaft 38b, or any other suitable means, connected by a rod 39 to one arm of a bell-crank lever 40. One end of a coil spring 46, which tends to pull the rod 39 in such a direction that the dog-clutch is disengaged, is hooked to the lever 40, the other end of said spring being anchored to the engine casing. The other arm of the bell crank lever 40 is provided with a guide 41 through which passes a rod 42 upon which a coil spring 43 is arranged, the opposite end of the spring abutting against a washer 44 backed by the lock-nuts 45. The end of the cable 37 is connected to the rod 42 and, therefore, when the cable 37 is wound upon the drum 32, (as when the drum is in the full line position Fig. 5) the spring 43 will be compressed between the guide 41 and washer 44 until such time as the energy thus stored in the spring 43 will be sufficient to cause the bell-crank lever 40 to turn against the pull of the spring 46 and, through the rod 49 and lever 38, to engage the dog-clutch. It will be appreciated that the pawl 34, by retaining the drum 32 against movement, also acts to prevent the dog-clutch being disengaged under the influence of the springs 43 and 46.

Limitation of the movement of the pinion 18 in the engaging direction is provided for by the engagement of the edges 60 and 61 of flanges 62 and 63 (Fig. 2) on the inner housing 16 with the edges 64 and 65 on battlements 66 and 67 provided on the outer casing 13. Similarly, movement of the pinion in the disengaging direction is provided for by the engagement of the edges 68 and 69 on the flanges 62 and 63 with the edges 70 and 71 on the said battlements.

The eccentricity of the axis of rotation of the pinion 18 is such that when the pinion is driving the crown wheel 28, the reaction between the engaging teeth will tend to force the teeth into deeper engagement. Conversely, in the event of the rotor hub overrunning the pinion the tendency will then be for the teeth on the pinion to be disengaged from those of the crown wheel and this will actually happen after the pawl 34 has been disengaged from the drum 32.

Although reference has been made above to a toothed starter pinion and the associated toothed gear wheel, it might be possible to use a friction pinion and wheel in some machines. In the operation of the aircraft above described, the rotor blades are normally kept at negative angle of incidence when on the ground. Before taking off, the pilot operates the handle 33 to the full line position shown in Fig. 5 to engage the dog-clutch 78—80 and to engage the starter pinion 18 with the gear 28, it being understood, of course, that the throw-off clutch 77 is in de-clutched position and its operating lever 127 is in the full line position shown in Figs. 1 and 9. The engine is then started, if not already running, and while running slowly, the throw-off clucth lever 127 is operated to dotted line position shown in Fig. 9 to operate the clutch 77 to clutched position. The aircraft is held stationary by means of wheel brakes and the engine is then accelerated and the rotor 2 driven through the clutch 77, gear box 74, rotor drive shaft 72, starter pinion 18, gear 28 until the rotor has obtained the predetermined speed. When this predetermined speed has been reached, the brakes of the aircraft (or other equivalent means) are released, and the incidence control lever 118 is pulled backward or to the right in Fig. 1 to the maximum blade angle of incidence position, this being accomplished through the cable 114 rotating cable drum 100.

As the lever 118 is moved to the maximum angle of incidence position, it operates link 120, lever 54, link 53, slide 36, pawl 36A, which consequently releases the pawl 34 from engagement with the shoulder or tooth 34A on the drum 32 (see Figs. 1, 6, and 9). This being accomplished, the spring 32b moves the drum 32 and its handle 33 to the dotted line position shown in Fig. 5 which actuate, through the cable 31, and housing 16, to disengage the pinion 18 from the gear 28; and at the same time the drum 32 slackens the cable 37, allowing the dog-clutch 78—80 to be disengaged through the medium of the rod 39, lever arms 38 and 38a, which are actuated by the springs 43 and 46. Also while this is taking place, movement of the lever 54 moves spindle 54a of the angle of incidence indicator 124 which, through the rod 131 moves the lock bar 135 to its dotted line position (Fig. 9), allowing the pawl 130 to disengage the throw-off clutch operating lever 127, which moves to its normal disengaging position, allowing the clutch 77 to move to de-clutched position, hence cutting off all drive from the motor 76 or other source of power. Thus, the aircraft becomes air borne after a forward run, the length of which depends to some extent upon the speed obtained by the rotor 1 before the drive is disconnected. Theoretically, it should be possible to take off in still air with no forward run. When the machine has climbed to the desired altitude, the pilot moves the rotor blade incidence control lever 118 forwardly or to the left in Fig. 1 for a distance to adjust angularity of the rotor blades to a desired or required normal flight position.

Having thus fully described the invention in one of its preferred embodiments, and the manner in which the same is to be performed, it is to be understood that the invention is not to be limited specifically to the details of construction or to the organization of parts herein described because the invention is susceptible of various changes and modifications and is only to be limited to such arrangements as fall within the scope of the appended claims, having due regard for equivalents.

We claim:

1. In an aircraft of the kind referred to, a rotor having variable incidence blades, means for varying the incidence of said blades, driving means, mechanism for operatively connecting the driving means to the rotor, said mechanism including a gear wheel associated with the rotor and a starter pinion mounted and disposed relatively to said gear wheel so that it can be moved into and out of mesh with the latter, means for locking said starter pinion into mesh with said gear wheel and means operated by operation of said incidence varying means to release said locking means.

2. In an aircraft of the kind referred to, a rotor having variable incidence blades, means for varying the incidence of said blades, a disconnectable power drive for said rotor; and means connected to said incidence varying means, and operable in response to operation thereof to increase the pitch of the blades, for disconnecting said power drive from said rotor.

3. In an aircraft of the kind referred to, a rotor, driving means, mechanism for operatively connecting the driving means to the rotor, said mechanism including a gear wheel associated with the rotor and a single starter pinion mounted and disposed relatively to said gear wheel for movement directly into and out of mesh with the latter, means for locking said starter pinion into mesh with said gear wheel, and means for releasing said locking means at will.

4. In an aircraft of the kind referred to, a rotor having variable incidence blades, means for varying the incidence of said blades, driving means, mechanism for operatively connecting the driving means to the rotor, said mechanism including a gear wheel associated with the rotor and a starter pinion mounted and disposed relatively to said gear wheel so that it can be moved into and out of mesh with the latter, means for locking said starter pinion into mesh with said gear wheel, means for releasing said locking means actuated manually and means connected to said incidence varying means and operable in response to operation thereof to release said locking means.

5. In an aircraft of the kind referred to, a rotor, driving means, mechanism for operatively connecting the driving means to the rotor, said mechanism including a gear wheel associated with the rotor and a starter pinion mounted and disposed relatively to said gear wheel so that it can be moved into and out of mesh with the latter, means for locking said starter pinion into mesh with said gear wheel, a clutch connecting said driving means with said starter pinion, and a single control means connected to both said locking means and said clutch for substantially simultaneously releasing said locking means and said clutch.

6. In an aircraft of the kind referred to, a rotor, driving means, mechanism for operatively connecting the driving means to the rotor, said mechanism including a gear wheel associated with the rotor and a starter pinion mounted and disposed relatively to said gear wheel so that it can be moved into and out of mesh with the latter, means for locking said starter pinion into mesh with said gear wheel, a clutch connecting said driving means with said starter pinion, and manual control means connected to both said locking means and said clutch for substantially simultaneously releasing said locking means and said clutch.

7. In an aircraft of the kind referred to, a rotor having variable incidence blades, means for varying the incidence of said blades, driving means, mechanism for operatively connecting the driving means to the rotor, said mechanism including a gear wheel associated with the rotor and a starter pinion mounted and disposed relatively to said gear wheel so that it can be moved into and out of mesh with the latter, means for locking said starter pinion into mesh with said gear wheel, a clutch connecting said driving means with said starter pinion, a single control means connected to both said locking means and said clutch for substantially simultaneously releasing said locking means and said clutch, manual operating means for said control means, and means connected to said incidence varying means and operable in response to operation thereof to operate said single control means.

8. In an aircraft of the kind referred to, a rotor, driving means for said rotor, means for connecting and disconnecting said driving means to and from the rotor, biasing means tending to move said connecting and disconnecting means into disconnecting position, a trip arranged to hold said connecting and disconnecting means in connecting position against the tension of said biasing means, manual means for moving said connecting and disconnecting means into connecting position and to set said trip in holding position, and means for manually operating said trip means to release said connecting and disconnecting means.

9. An aircraft, as claimed in claim 8, further characterized by the rotor having variable incidence blades, means for varying the incidence of said blades, single control means for actuating said connecting and disconnecting means and said trip means, manual operating means for said control means and means connected to said incidence varying means and operable in response to operation thereof to operate said single control means and said incidence varying means.

10. In an aircraft of the kind referred to, a rotor having variable incidence blades, means for varying the incidence of said blades, driving means for said rotor, means for connecting and disconnecting said driving means to and from the rotor, biasing means tending to move said connecting and disconnecting means into disconnecting position, a trip arranged to hold said connecting and disconnecting means in connecting position against the tension of said biasing means, a crank arm rotated in the operation of said incidence varying means, a slide bar having an elongated slot with relatively fixed spaced pins extending in said slot for guiding said slide bar in straight line movement, motion transmitting linkage connecting said slide bar with said crank arm for sliding movement in response to operation of said incidence varying means, said slide bar being provided with a cam element arranged to operatively engage with the said trip to release it to allow the biasing means to operate.

11. An aircraft, as claimed in claim 10, in which the trip element is provided with means permitting manual operation thereof at will.

12. In an aircraft of the kind described, a rotor having variable incidence sustaining blades, means for varying the incidence of said blades, a power drive for the rotor and including a clutch means in said power drive, means connected to said incidence varying means and said clutch means for disconnecting the power drive from said rotor upon movement of the incidence varying means from a negative angle of incidence to a positive angle of incidence, and safety means normally biased to break the connection between said power drive and the rotor when the blades are in other than a negative no-lift angle of incidence, whereby the rotor will not be rotated from the power drive should the clutch means be engaged while the blades are in a positive angle of incidence.

13. In an aircraft of the kind described a rotor having variable incidence sustaining blades, means for varying the angles of incidence of the rotor blades, mechanism for driving the rotor including a plurality of disconnectable means, and means operatively connected with said angle varying means and operable in response to movement thereof to operate one of said disconnectable means to break the connection between the rotor and its driving means automatically as soon as the blades have been adjusted or set to predetermined angles of incidence, one of said disconnectable means comprising a starter pinion adapted to be placed into and out of mesh with a gear wheel on the rotor hub.

JOHN WILLIAM DYER.
DAVID KAY.